United States Patent
Treiber et al.

(10) Patent No.: US 9,030,488 B2
(45) Date of Patent: May 12, 2015

(54) METHOD FOR MAKING AVAILABLE A DISPLAY OF AN OBJECT ON A MOTOR VEHICLE DISPLAY DEVICE

(75) Inventors: Alexander Treiber, Ingolstadt (DE); Stephan Hummel, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/116,534

(22) PCT Filed: Apr. 27, 2012

(86) PCT No.: PCT/EP2012/001807
§ 371 (c)(1),
(2), (4) Date: Nov. 8, 2013

(87) PCT Pub. No.: WO2012/152384
PCT Pub. Date: Nov. 15, 2012

(65) Prior Publication Data
US 2014/0085327 A1    Mar. 27, 2014

(30) Foreign Application Priority Data
May 10, 2011    (DE) .......................... 10 2011 101 004

(51) Int. Cl.
G09G 5/37    (2006.01)
G06T 11/20   (2006.01)
B60K 35/00   (2006.01)

(52) U.S. Cl.
CPC .............. *G09G 5/37* (2013.01); *G06T 11/206* (2013.01); *B60K 35/00* (2013.01); *B60K 2350/1072* (2013.01); *B60K 2350/1096* (2013.01)

(58) Field of Classification Search
USPC .......................................... 345/620
See application file for complete search history.

(56) References Cited

U.S. PATENT DOCUMENTS

| 5,450,094 | A  * | 9/1995 | Li et al. ............................ 345/31 |
| 7,557,824 | B2 * | 7/2009 | Holliman ........................ 348/46 |
| 2002/0093539 | A1* | 7/2002 | Os et al. ......................... 345/810 |
| 2006/0039623 | A1 | 2/2006 | Chaudhury et al. |
| 2008/0088526 | A1 | 4/2008 | Kadantseva et al. |
| 2008/0309475 | A1* | 12/2008 | Kuno et al. .................... 340/462 |
| 2010/0302023 | A1* | 12/2010 | Michaelis ...................... 340/461 |

FOREIGN PATENT DOCUMENTS

| DE | 69033211 | 11/1999 |
| DE | 10020977 | 10/2001 |
| DE | 10144783 | 4/2003 |

(Continued)

OTHER PUBLICATIONS

Machine Translation to English of DE 102009007836 A1.*

(Continued)

Primary Examiner — David Zarka
Assistant Examiner — Terrell Robinson
(74) Attorney, Agent, or Firm — Staas & Halsey LLP

(57) ABSTRACT

In order to provide a display of an object on a display device of a motor vehicle, a basic shape of the object is first displayed and the display is then changed, this change simulating rotation, tilting and/or displacement only of a first part of the object. In respect of the remaining, second part of the object, a display on the basis of the basic shape is maintained at least in regions. In this way, space can be obtained on the display device and a significant portion of the object can nevertheless be displayed in an unchanged form at the same time.

10 Claims, 1 Drawing Sheet

(56) References Cited

FOREIGN PATENT DOCUMENTS

| | | |
|---|---|---|
| DE | 10238095 | 3/2004 |
| DE | 102005039128 | 2/2007 |
| DE | 69933436 | 8/2007 |
| DE | 102009007836 | 10/2010 |
| DE | 102009023203 | 12/2010 |
| DE | 102009023867 | 12/2010 |
| GB | 1195673 | 4/2002 |
| GB | 2154648 | 2/2010 |
| JP | 2006-191210 | 7/2006 |

OTHER PUBLICATIONS

Machine Translation to English of DE 10144783 A1.*

WIPO English language translation of International Preliminary Report on Patentability for PCT/EP2012/001807, issued Nov. 14, 2013, 5 pages.

English Language International Search Report for PCT/EP2012/001807, mailed Sep. 10, 2012, 3 pages.

German Office Action for German Priority Patent Application No. 10 2011 101 004.5, issued Jan. 12, 2012, 5 pages.

* cited by examiner

METHOD FOR MAKING AVAILABLE A DISPLAY OF AN OBJECT ON A MOTOR VEHICLE DISPLAY DEVICE

CROSS REFERENCE TO RELATED APPLICATIONS

This application is based on and hereby claims priority to International Application No. PCT/EP2012/001807 filed on Apr. 27, 2012 and German Application No. 10 2011 101 004.5 filed on May 10, 2011, the contents of which are hereby incorporated by reference.

BACKGROUND

The invention relates to a method for providing a display of an object on a display device of a motor vehicle.

Instruments which were previously provided in physical form in motor vehicles are increasingly being replaced by virtual instruments which are displayed on a display device of a motor vehicle. One example of this is the tachometer. In order to achieve the effect of familiarity, the speed is not displayed on the display device in an abstract manner, but rather a tachometer is actually displayed as an object. A tachometer of this kind has a border in the shape of the previous housing in the dashboard. The center of said tachometer contains, for example, a display area comprising a scale with respect to which a pointer moves, or display areas for vehicle-related status information ("warning lamps"), driver assistance systems, infotainment or navigation.

Owing to the use of a display device, for example a screen, an LCD or LED display, a plasma display or the like which can be electronically controlled and in which a display is made up of a large number of pixels, computer technologies of any type can be used for displaying objects. By way of example, EP 2 154 648 A1 describes a plurality of possible ways of changing an image display, including tilting, but also rotating etc., the display with respect to an image plane.

DE 10 2009 007836 A1 describes a combination instrument for a motor vehicle having a freely programmable display device by which operation-related information can be displayed in dependence on a preselected driving mode. In this case, different information can be displayed on the combination instrument—depending on the selected driving mode—with, for example, additional information about the $CO_2$ emissions by the motor vehicle being shown or hidden within a virtually displayed rev counter.

EP 1 195 673 A1 likewise describes a display device for a motor vehicle, in particular for a multimedia system of a motor vehicle. Several different pictograms (icons) are displayed by the display device. When one of the pictograms is selected, it is displayed in enlarged form, whereas the others, that is to say the pictograms which have not been selected, are displaced on the display device in order to provide the required space on the display device for the enlarged display of the selected pictogram. In addition, the size of the pictograms which have not been selected can also be reduced.

DE 101 44 783 A1 describes a display device, which is in the form of a tachometer, for a motor vehicle. A respective region in which a tachometer needle is currently located can be increased in size in the process in order to display a tachometer scale and the tachometer needle in enlarged form in this region and therefore make them easier to read.

DE 10 2009 023 203 A1 likewise describes a display device for a motor vehicle, a particularly easily readable geometry being selected by said display device given a perspective display of information which is to be displayed.

In practice, the options provided by computer technology are used only to a very limited extent in a motor vehicle: the display device of the motor vehicle often operates during driving too. However, in this case it is important that the driver considers the display to be convenient, easy to reach etc. Laws and rules regarding options for displays of this kind are also prespecified.

It would be desirable to use a display area in a motor vehicle (that is to say the display device) in a more flexible manner. The display device should be part of a fully programmable combination instrument which both provides a variety of operating control options and at the same time can be operated in a simple manner.

SUMMARY

One possible object is to disclose a method for providing a display of an object on a display device of a motor vehicle, said method increasing the number of possible ways of using the display device of a motor vehicle in view of convenience requirements, safety requirements and laws and regulations.

The inventors propose a method in which a basic shape of the object is first displayed. However, the display is then changed, this change simulating rotation, tilting and/or displacement only of a first part of the object (in respect of the plane of the display device), that is to say a virtual rotation, wherein, in respect of the remaining, second part of the object, a display on the basis of the basic shape is maintained at least in regions.

In this case, the proposed method is distinguished in that the first part forms a frame around the second part, and only the first part is virtually rotated about a coupling axis, whereas the second part remains unchanged and is cropped in one region only owing to the rotation of the first part over the second part and in the process maintains its original proportions, wherein the first part is compressed orthogonally to the coupling axis and within the plane of the display device.

The method is based on the knowledge that rotation of a part of the object leads to the display taking up less space on the display device, with the result that the space which is obtained as a result can be used for something else, while, however, ensuring in the region of the second part of the object that the vehicle driver does not have to imagine the rotation, but rather receives an unchanged image. A good compromise between the desire to save space for the display and, on the other hand, to change the display as little as possible is obtained by virtue of dividing the object into a part which is to be rotated and into a part which is not to be rotated—this can also be imagined as the next object being rotated and then a part of it being rotated back again.

If warning icons are displayed in this display region, it is likely that the user will be legally required to be provided with an unchanged image since the icons in question must not be changed—that is to say not distorted either.

In the event of a change in the display, the second part is shown as if it were connected to the rotated first part by a coupling axis in a preferred embodiment. In this way, the object is treated as a kind of mobile, wherein the movement of the parts in space (or the non-movement in the case of the second part) is then displayed in two dimensions. This has the advantage that the virtual display creates the impression of an actual object.

In a preferred embodiment, the change in the display depends on an operating state of the motor vehicle which is preferably related to a functional unit of the motor vehicle which itself differs from the display device or to the entire motor vehicle, for example relates to the speed of said vehicle.

In this way, the division into the first and the second part can, for example, be performed in dependence on the operating state in such a way that information which is required by the driver in the respective operating state is still sufficiently well displayed, while other information is moved into the background owing to the rotation.

In a preferred variant of this embodiment, the extent of the simulated rotation of the object depends on an operating state of the motor vehicle, preferably directly on an operating parameter. By way of example, in the case of a motor vehicle with a manual transmission, the rev counter can be displayed in the basic shape at low and high rotation speeds, and with partial rotation of the first part in the intermediate regions. The rev counter then turns away to a certain extent on the display device in order to make space for other displays if the information relating to the rotation speed is not extremely important. In the same way, it is possible, for example, to partly rotate a display relating to the filling level of the fuel tank when the fuel tank is more than a third full, but otherwise not.

In a second variant of the embodiment in which the change in the display is dependent on an operating state of the motor vehicle, the basic shape in relation to the second part of the object is maintained in a region which is selected in dependence on the operating state of the motor vehicle. For example, in the case of a tachometer, it is possible to rotate the tachometer housing but not the speed scale. If, however, the speed scale is displayed only in one region, that region which comprises the speed at which the vehicle is currently traveling is always displayed. Therefore, at a relatively low speed of the motor vehicle, the upper regions of the scale can be hidden, and the lower ranges can be hidden at a relatively high speed. In particular, the ranges can be adjusted in dependence on an operating state of the motor vehicle by a coupling axis being selected in dependence on the operating state of the motor vehicle when the second part is shown as if it were connected to the rotated first part by this coupling axis.

As already stated, the object comprises or is a display instrument for displaying an operating state. In this case, the first part of the object forms an open and closed frame and the second part of the object forms a display region of the object, or both parts can form parts of a display (for example a virtual analog tachometer in the outer part, which has a digital display of the same speed value in the inner, second part) or display two items of information which are independent of one another (for example a virtual analog rev counter which displays various items of vehicle status information in the form of icons in its interior). Realizing the proposals in the display of display instruments takes into account the fact that it is desirable and sometimes a legal requirement for certain aspect ratios to be met or kept constant when displaying a display instrument on a display device. Therefore, that region to which a desire of this kind or a requirement of this kind does not relate is rotated, and the other part is maintained in an unchanged form.

Displaying the object advantageously takes up less space on the display device than the basic shape owing to the change in the display. The space which is obtained as a result is then used for providing a further display. In this way, the display device can be used in an optimum and flexible manner.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
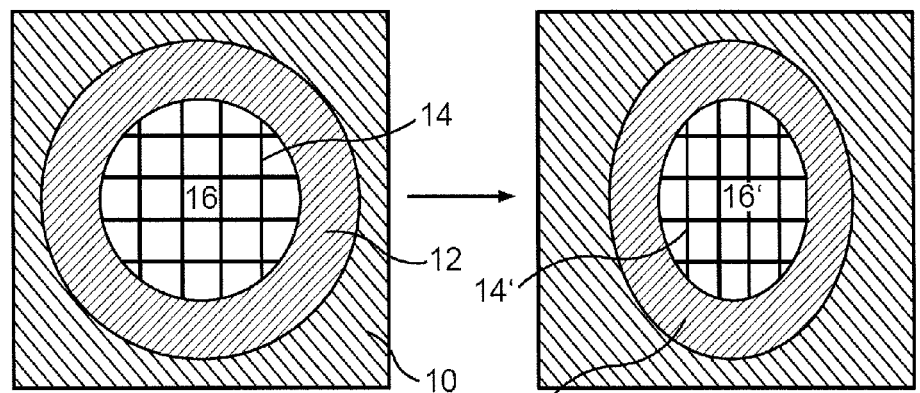
FIG. 1 illustrates rotation of the display of an object according to the related art.

Reference will now be made in detail to the preferred embodiments of the present invention, examples of which are illustrated in the accompanying drawings, wherein like reference numerals refer to like elements throughout.

In a vehicle, a tachometer (which is shown only symbolically in the figures) is displayed on a display device 10 which has a large number of pixel elements which each determine the appearance of a pixel in an image. The tachometer comprises a frame 12 as a first part and a display area 14 as a second part, the scale (not illustrated in the figure) and the associated pointer being displayed in said display area.

If space is now intended to be obtained on the display device 10, the tachometer can be virtually rotated: both the frame 12 is rotated to form the frame 12' and the display area 14 is rotated to form the display area 14'.

The display area 14' is characterized in that, owing to the rotation, it is compressed in one direction, whereas there is no compression in the other direction. This can be recognized on the basis of the shown squares, for example by square 16 which is compressed to form a rectangle 16'.

In the case of a tachometer, it is not desirable for the display area comprising the scale to be rotated and compressed. However, it is desirable to obtain space on the display device 10 by virtue of virtual rotation.

Figure 2:
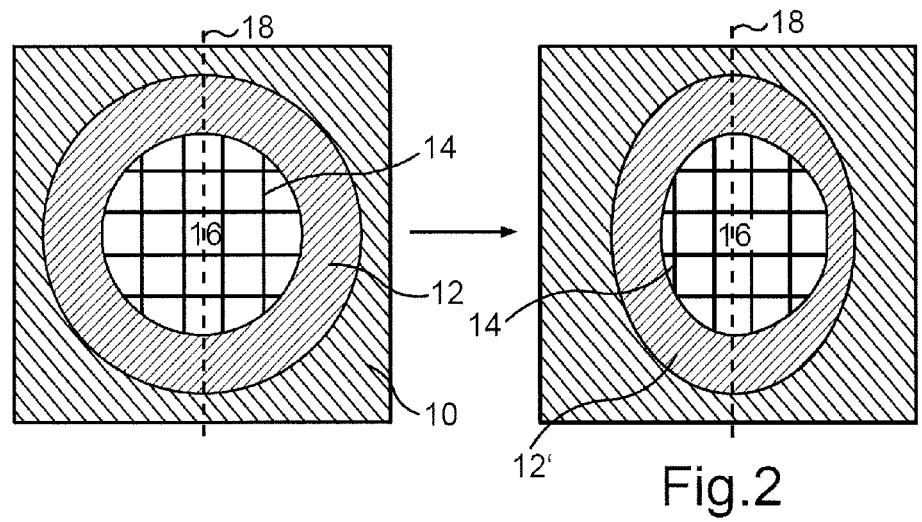
FIG. 2 illustrates rotation of a part of an object, as is provided in the case of the proposed method.

For this reason, the following procedure is followed in the case of the proposed method: the frame 12 and the display area 14 are considered to be two parts which are independent of one another and which are coupled to one another by a coupling axis 18. It is possible to imagine this in the form of a mobile in which an inner circular disc is surrounded by an outer ring which can be rotated in relation to said inner circular disc. Only the outer ring, that is to say the frame 12, is now virtually rotated, to form the frame 12', whereas the display area 14 remains unchanged and is cropped to a certain extent in its part which is on the left in FIG. 2 only owing to the rotation of the outer ring over it.

It is possible to imagine this in the image of the mobile as the part 14 remaining stationary in relation to the viewer, whereas the outer ring 12 rotates relative to the viewer.

In the case of the tachometer, the display area retains the original proportions in this way, that is to say the square 16 remains the square 16.

The extent of the rotation or else the direction of the rotation can optionally be made dependent on the type and the range of the content which is to be displayed in the display area 10, possibly also on the traveling speed. Since the display area 14 is cropped in its left-hand region by the rotation, it is advisable to do this only at high speeds when only the right-hand part is required. At low speeds, rotation can be performed to a small extent or not at all, or rotation can be performed in the opposite direction, so that the right-hand part of the display area 14 is cropped in this case. Otherwise, the desires of the operator can be allowed, for example rotation can be performed, when certain menu items are selected, certain icons are activated etc.

Instead of or in addition to rotation, tilting or displacement can also be performed.

The proposed mechanism can be used anywhere in this display device 10 (display) where, when there are two displays which are situated one above the other and each provide information, one is intended to be tilted, rotated or displaced in relation to the other.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for displaying an operating state on a display device of a motor vehicle, comprising:

presenting a display of a basic shape of a display instrument, the display instrument comprising first and second parts, the first part forming a frame around the second part, the second part forming a display area of the display instrument;

changing the display to produce simulated rotation only of the first part over the second part about a coupling axis which lies in a plane of the second part, to compress the first part orthogonally to the coupling axis and within a plane of the display device, such that the display of the display instrument takes up less space on the display device owing to the changing;

maintaining a two-dimensional maintained region of the second part unchanged while simulating rotation of the first part, such that the two-dimensional maintained region of the second part maintains its original proportions and a basic shape of the second part is maintained; and cropping only a cropped region of the second part owing to simulated rotation of the first part.

2. The method as claimed in claim 1, wherein changing the display is dependent on an operating state of the motor vehicle.

3. The method as claimed in claim 2, wherein simulated rotation of the first part is performed to an extent which is dependent on the operating state of the motor vehicle.

4. The method as claimed in claim 2, wherein simulated rotation of the first part is performed to an extent which is directly proportional to the operating parameter of the motor vehicle.

5. The method as claimed in claim 4, wherein
   the display instrument is a tachometer,
   the operating state of the motor vehicle is a motor speed of motor vehicle, and
   simulated rotation of the first part is performed so that the motor speed at which the vehicle is currently operating is always displayed.

6. The method as claimed in claim 2, wherein the two-dimensional maintained region of the second part comprises a region of the basic shape selected in dependence on the operating state of the motor vehicle.

7. The method as claimed in claim 1, wherein the coupling axis is selected in dependence on the operating state of the motor vehicle.

8. The method as claimed in claim 1, wherein the first part forms an open frame around the second part.

9. The method as claimed in claim 1, wherein the first part forms a closed frame around the second part.

10. The method as claimed in claim 1, wherein
    when the display of the display instrument takes up less space on the display device, space is obtained, and
    the space is used for providing a further display.

* * * * *